Oct. 5, 1937.  H. O. PETERSON  2,095,078
DIRECTIVE ANTENNA SYSTEM
Filed May 29, 1934  2 Sheets-Sheet 1
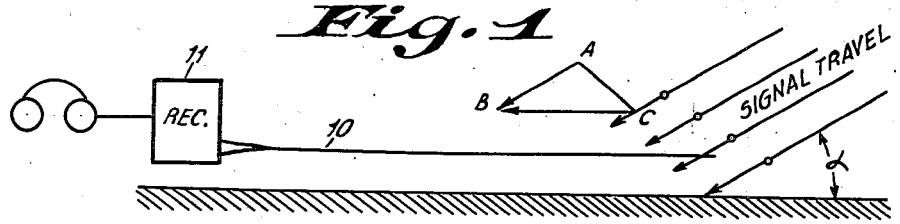
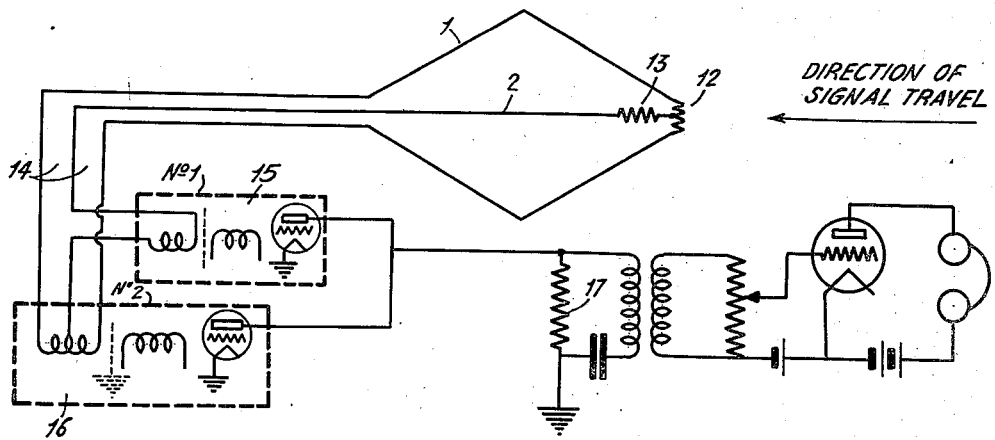
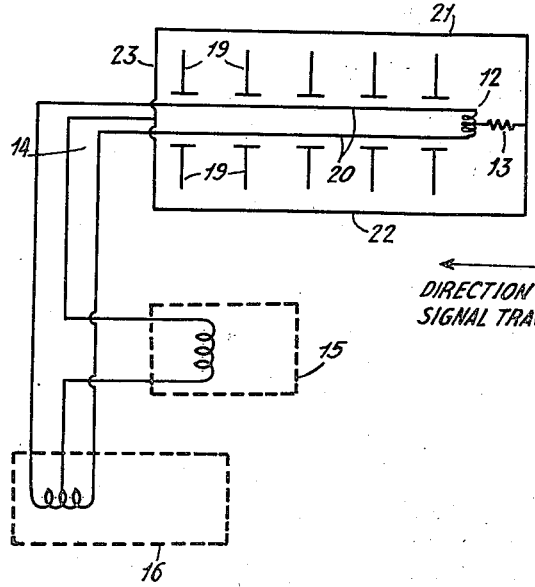
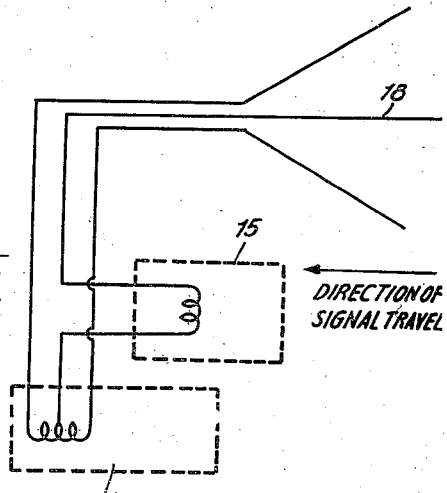
INVENTOR
H. O. PETERSON
BY
ATTORNEY Oct. 5, 1937.   H. O. PETERSON   2,095,078
DIRECTIVE ANTENNA SYSTEM
Filed May 29, 1934   2 Sheets-Sheet 2
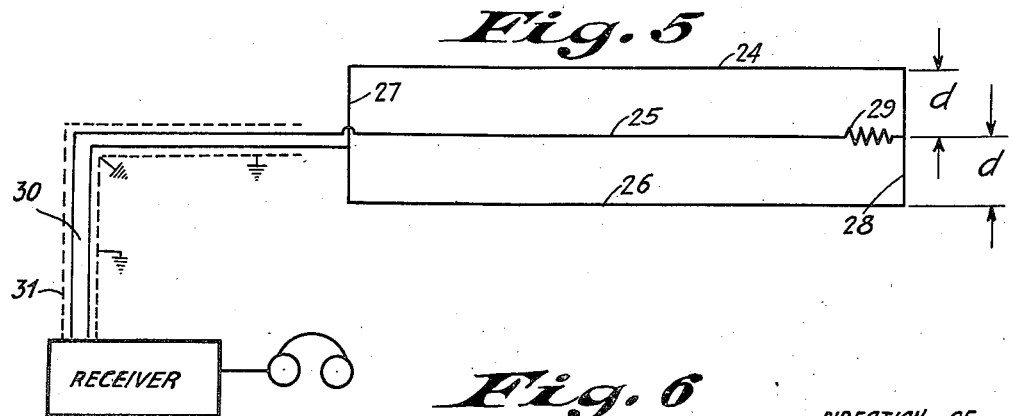
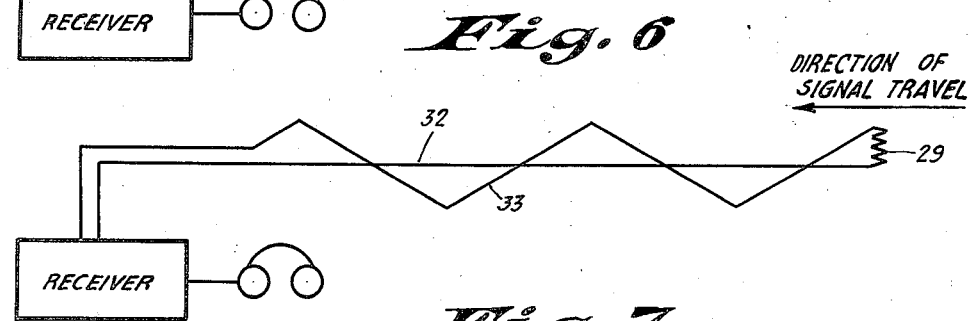
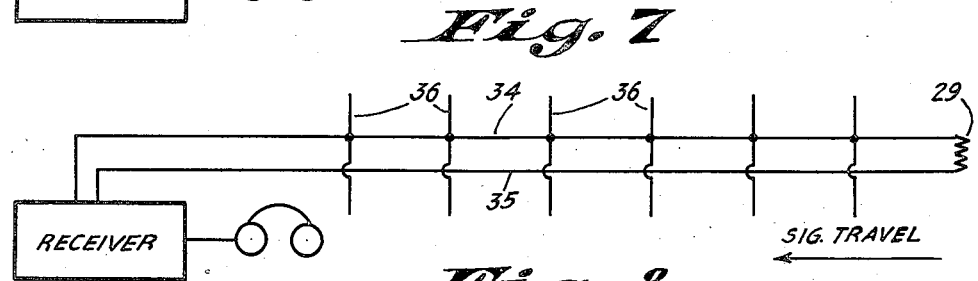
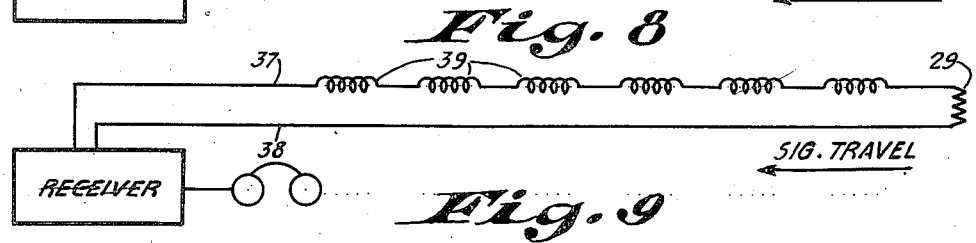
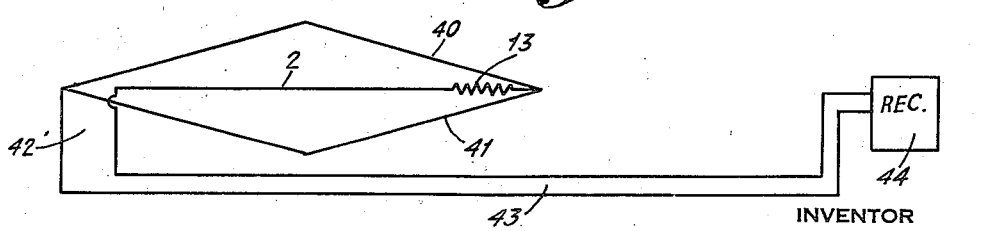
INVENTOR
H. O. PETERSON
ATTORNEY Patented Oct. 5, 1937

2,095,078

UNITED STATES PATENT OFFICE 2,095,078

DIRECTIVE ANTENNA SYSTEM

Harold Olaf Peterson, Riverhead, Long Island, N. Y., assignor to Radio Corporation of America, a corporation of Delaware Application May 29, 1934, Serial No. 728,072

15 Claims. (Cl. 250—33)

This invention relates to improvements in directive antenna systems.

The principles underlying the invention are described in connection with Fig. 1, which represents a side view of a well known form of receiving antenna. This figure illustrates, diagrammatically, the situation for a so-called vertically polarized signal arriving at the receiving antenna at an angle above the horizon designated $\alpha$. The magnetic flux lines in such a case are perpendicular to the plane of the paper and advance in the directions of the arrows shown, from which it is apparent that the flux lines cut the antenna conductor 10 and induce a voltage therein which is longitudinal with respect to the conductor. This voltage will build up along the conductor toward the receiver 11 in the manner described in United States Patent No. 1,381,089, granted June 7, 1924, to Harold H. Beverage. There is also indicated above the antenna a triangle A—B—C, in which A—B represents the distance of signal travel through space, and B—C represents the corresponding length of wire traversed by the signal in the same length of time. Since the velocity of the ether wave is greater than that of the current wave in the antenna, it will be seen that the distance travelled along the conductor is longer than the distance of signal travel in space; for which reason the signal voltages induced in the conductor will tend to lag behind the advancing signal in space. An optimum condition will thus result when this lag of the signal in the conductor, in going from one end to the other, amounts to approximately 180° difference in the phase angle. Consequently there is an optimum relationship which exists between the length of the conductor, the angle of arrival $(\alpha)$, and the velocity of propagation in the conductor. It is an object of the present invention to make use of this optimum relationship, which is done in the various antenna designs described hereinafter.

Fig. 1 shows conventionally, a well known form of antenna, and

Fig. 2 illustrates the principles of the invention as applied to a directive antenna combination capable of receiving in a directive manner both the horizontal and vertical polarized component of the signal wave. Means for receiving and combining the signal from the two components is also shown.

Fig. 3 shows another such arrangement.

Fig. 4 illustrates a third type of receiving antenna combination capable of independently receiving both the horizontal and the vertical component.

Figs. 5-9, inclusive, are other embodiments showing antennae in accordance with the principles underlying the invention.

Referring to Fig. 2, which illustrates a plan view of the antenna in which all the conductors are substantially parallel with the surface of the earth, there is shown a diamond shaped antenna 1 and a single wire antenna 2 symmetrically located with respect to the two halves of the diamond and joined thereto at its apex by means of a resistance 13 of a value equal to the surge resistance of the wire. Similarly, the two halves of the resistance 12 represent the surge impedances of the respective halves of the diamond. In the system of this figure the vertically polarized component of the wave, received from the distant transmitting station, will induce a signal in all of the conductors. Since the signal components induced in the outside conductors of the diamond are obliged to travel a greater distance than those induced in the central conductor 2, it follows that the resultant in the central conductor 2 will be out of phase with the resultants accumulating in the outside conductors at the output end of the antenna. A voltage will thus appear between the central conductor and the two outside conductors considered as operating in parallel and this voltage may be transmitted over a transmission line 14 and received in a receiving circuit 15. The horizontally polarized component of the received waves will cause a voltage to appear between the two outside conductors of the diamond 1 at the output end i. e., the end joined to the transmission line 14. This voltage is available at the receiver represented as 16. Both receivers 15 and 16, herein shown diagrammatically in box form, incorporate the usual amplifying and selective circuits commonly used in receiving practice. In these receivers the signal is finally passed into detectors, the outputs of which are combined at 17. The relationship between the angles of the wires and the lengths of the conductors may be so chosen as to give optimum conditions of signal voltage at the output end leading to the receivers 15 and 16. Signals arriving from the reverse direction will be damped out by means of the network comprising surge impedances 12 and 13. It should herein be noted that impedance 13 is connected to the midpoint of impedance 12.

Since the operation of the receiving circuits forms no part of the present invention per se, and is well known in the art, it will not be described herein.

Fig. 3 illustrates an arrangement similar to Fig. 1 for combining a V-shaped antenna comprising two diverging wires provided for receiving horizontally polarized components of the signal wave and another wire 18 symmetrically disposed with respect to the diverging wires of the V for receiving the vertical component of the signal wave.

Fig. 4 represents a combination of conductors in which the horizontally polarized component is intercepted by substantially horizontal doublets 19, the latter being capacitively coupled to the transmission line 20 located in the center of a rectangular shaped conductor system. The vertically polarized component of the transmitted wave will be picked up on the two outer side wires 21, 22 of the rectangular shaped combination and on the transmission line 20 in the center thereof. The cross connection 23 for the two wires 21, 22 introduces a phase change sufficient to produce a voltage due to the vertical component, which voltage finally reaches receiver 15 through the transmission line system 14. As in Fig. 2, the combination damping network 12, 13 at the far end serves to prevent reflection of signals arriving from the reverse direction.

The operation of the side or outer wires 21, 22 of Fig. 4 is more clearly understandable from a reference to Fig. 5, which illustrates an antenna system comprising three parallel conductors 24, 25, 26. The incoming signal received on these conductors will build up voltages simultaneously on all three of these conductors. At the output end connected to the transmission line leading to the receiver, the resultant from the two outside wires 24, 26 is caused to travel through an additional section of line whereby there is obtained an appreciable change of phase with the consequent production of the effect of a voltage difference appearing between the two conductors of the transmission line. Such a phase change may be obtained by physically spacing apart the two outside conductors a distance D, approximately one-half wave length at the operating frequency, and cross connecting these conductors by linear wires 27, 28. If desired, conductors 24, 25, 26 may be spaced closer together, and the cross-connecting conductors 27, 28 bent in such manner as to provide sufficient length to produce the desired phase change. A resistance 29 at the far end of conductor 25 serves as a damping impedance. If it is desired to have a minimum of voltage picked up in the transmission line 30, there may be employed a shielded type of line comprising a surrounding metallic sheath 31 which is continuously grounded, as indicated.

Fig. 6 represents an antenna in which the travelling wave front builds up a voltage in two conductors 32, 33, one of which (33) is staggered and is longer than the other so that at the output end there is obtained a phase difference between the resultants in the two conductors. A damping impedance 29 connects the far ends of the two wires 32, 33 of the antenna system together.

Fig. 7 similarly comprises two conductors 34, 35 which are joined together at their far ends by a damping resistance 29, one of the conductors being arranged to pick up signal voltages which are caused to have a lower phase velocity than the voltages in the other conductor by the addition of elements 36 connected thereto, these elements merely introducing capacitance between the conductor 34 and the earth. In this way the resultant voltage built up in one wire of the two will lag behind that of the other wire and there will accordingly appear a voltage difference between 34 and 35 at the output end leading to the receiver.

Fig. 8 shows a conductor system comprising two wires 37 and 38 connected together at their far ends by a damping impedance 29 wherein conductor 37 is made to have a lower phase velocity by the introduction of series inductances 39 which are spaced apart along the length of the conductor. This inductance may, in some cases, be introduced in the form of a continuous body of magnetic substance in close proximity to the conductor.

It is known that the earth acts as a reflector for the radio waves in much the same way as an ordinary mirror functions with respect to light waves, and also that for certain types of soil there is a critical angle at which no reflection of the vertical polarized component occurs. Long Island soil, for example, at Riverhead, has a critical angle of approximately 19° above the horizontal, and it will thus be evident that if an antenna is designed for the reception of the 19° vertically polarized component, it may be situated at an elevation much closer to the earth than has been the general practice in antennas designed to receive other components. For which reason it is proposed, in some cases, to design the receiving antenna and so position it near the surface of the earth as to exclude to a large extent all the other components except the 19° vertically polarized component. Such an antenna system is very economical to build because of the absence of the necessity for using high structures, and is superior for the reception of ultra high speeds of transmission since it discriminates against many undesired components, thus tending to eliminate troubles due to multipath phenomena.

It may be advantageous to run the transmission line parallel to and directly under the antenna system for a considerable distance, so that the natural directivity of the transmission line system itself will be along the same direction as that of the antenna structure. Fig. 9 shows such an arrangement wherein the two symmetrical sides 40 and 41 of the diamond antenna are connected together at the two apices, and connect at one end through a surge impedance with the middle wire 2. At the other end, wire 2 and the two side wires 40 and 41 in parallel are connected to a pair of down leads 42 which, in turn, connect to the transmission line 43, carrying the signal to the receiving station 44.

It is to be understood that the antenna systems of the invention may be used for transmitting as well as receiving and are not limited to the precise arrangement of parts shown since various departures from the systems illustrated may be employed within the scope of the invention.

What is claimed is:

1. In a high frequency receiving system, an antenna system comprising a diamond shaped antenna located substantially in a horizontal plane and extending substantially in the direction of the transmitting station, and a substantially horizontal conductor extending between two opposite apices of said diamond and in the direction of the received waves, and joined to that apex of said diamond which is nearest the transmitting station, a receiver for receiving the waves produced on said diamond, a separate receiver for receiving the waves produced on said conductor, and means for combining the outputs of both of said receivers.

2. In a high frequency receiving system, an antenna system comprising a diamond shaped antenna located substantially in a horizontal plane and a substantially horizontal conductor extending between two opposite apices of said diamond and in the direction of the received waves, a receiver for receiving the waves produced on said diamond, a separate receiver for receiving the waves produced on said conductor, and means for combining the outputs of both of said receivers.

3. A system in accordance with claim 1 including a surge impedance connecting said horizontal conductor with said apex nearest the transmitting station for damping out signals arriving from the reverse direction.

4. In a high frequency receiving system, an antenna arrangement comprising a diamond shaped antenna located substantially in a horizontal plane, and a substantially horizontal conductor extending between two opposite apices of said diamond and in the direction of the received waves and joined to said apex which is nearest the transmitting station, an inductance joining together the ends of the diamond farthest removed from the transmitting station and an inductance connecting said substantially horizontal conductor to a point on said first inductance intermediate its ends, and high frequency apparatus coupled to both said inductances.

5. An antenna system comprising a V antenna having two diverging conductors extending substantially in the direction of the received waves, and a substantially horizontal conductor in the plane of the bisector of the angle formed by said V, an inductance joining together the adjacent ends of the V which are closest together, and an inductance connecting said substantially horizontal conductor to a point on said first inductance intermediate its ends, and high frequency apparatus coupled to both said inductances.

6. In a high frequency receiving system, an antenna comprising a rectangularly shaped conductor system extending in the direction of radiant action, a single wire element extending longitudinally of the length of said conductor system and in the center and in the same plane thereof, an impedance connecting said wire to said conductor system, high frequency apparatus for receiving the energy received by said antenna elements, the outer wires of said rectangular system being so spaced and formed that the energy delivered to said high frequency apparatus is substantially 180° out of phase with respect to the energy delivered by said single wire to said high frequency apparatus.

7. The combination with an antenna system comprising three parallel wires extending substantially in the direction of the received wave, adjacent wires being spaced apart from each other one-quarter of a wave length, the outer two wires being directly connected together at both of their ends, of means for obtaining from said outer wires energy received thereby which is out of phase substantially a predetermined amount with respect to the energy obtained from said inner wires.

8. An antenna system comprising an antenna having two diverging conductors extending substantially in the direction of the received waves, and a conductor in the plane of the bisector of the angle formed by diverging conductors, an inductance joining together the adjacent ends of the diverging conductors which are closest together, and an inductance connecting said conductor in the plane of the bisector to a point on said first inductance intermediate its ends, and high frequency apparatus coupled to both said inductances.

9. In a high frequency receiving system, an antenna arrangement comprising a diamond shaped antenna located substantially in a horizontal plane, and a substantially horizontal conductor extending between two opposite apices of said diamond and in the direction of the received waves and joined to said apex which is nearest the transmitting station, a resistance joining together the ends of said diamond nearest the transmitting station, and a second resistance having a value equal to the surge impedance of the horizontal conductor connecting said horizontal conductor and said first resistance at a point intermediate the ends of said first resistance, the portions of said first resistance on both sides of said intermediate point representing the surge impedances of the respective halves of said diamond-shaped antenna, and high frequency apparatus coupled to the ends of said diamond-shaped antenna and the end of said horizontal conductor farthest removed from the transmitting station.

10. In a high frequency receiving system, an antenna arrangement comprising a diamond shaped antenna located substantially in a horizontal plane, and a substantially horizontal conductor extending between two opposite apices of said diamond and in the direction of the received waves and joined to said apex which is nearest the transmitting station, a resistance joining together the ends of said diamond nearest the transmitting station, and a second resistance having a value equal to the surge impedance of the horizontal conductor connecting said horizontal conductor and said first resistance at a point intermediate the ends of said first resistance, the portions of said first resistance on both sides of said intermediate point representing the surge impedances of the respective halves of said diamond-shaped antenna, an inductance joining together the ends of the diamond farthest removed from the transmitting station and an inductance connecting said substantially horizontal conductor to a point on said first inductance intermediate its ends, and high frequency apparatus coupled to both said inductances.

11. In a high frequency receiving system, an antenna comprising a pair of spaced conductors located in a plane and extending substantially in the direction of the transmitting station, said conductors being joined together at those adjacent ends which are nearest the transmitting station, and a third conductor located between and spaced away from said pair of conductors and connected to the joined ends of said pair, a receiver for receiving the waves produced on said pair of conductors and a separate receiver for receiving the waves produced on said third conductor, and means for combining the outputs of both of said receivers.

12. In a high frequency system, an antenna comprising a pair of spaced conductors extending in the general direction of the station with which said antenna is communicating, said conductors being joined together at those adjacent ends which are nearest said station, and a third conductor located between and spaced away from said pair of conductors and connected to the joined ends of said pair, and high frequency apparatus coupled to all of said conductors at their ends remote from said station.

13. In a high frequency receiving system, an antenna comprising a pair of spaced conductors extending substantially in the direction of the transmitting station, said conductors being joined together at those adjacent ends which are nearest the transmitting station, and a third conductor located between and spaced away from said pair of conductors and connected to the joined ends of said pair, a receiver for receiving the waves produced on said pair of conductors and a separate receiver for receiving the waves produced on said third conductor, and means for combining the outputs of both of said receivers.

14. In a receiving antenna system having three conductors, two of which are of equal length and the third of a different length, the method of operation which comprises receiving the vertically polarized component of the signal wave on all three conductors, receiving the horizontally polarized component of the signal wave on said two conductors of equal length, obtaining a resultant voltage of said vertically polarized component between said two conductors of equal length and said third conductor, obtaining a resultant voltage of said horizontally polarized component between said two conductors of equal length, and combining said two resultant voltages to obtain a magnified voltage.

15. In a receiving antenna system having three conductors, two of which are of equal length and the third of a different length, the method of operation which comprises receiving a component of the signal wave on all three conductors, obtaining from said signal wave a voltage appearing between said two conductors, also obtaining from said signal wave another voltage between said two conductors considered in parallel and said third conductor, separately amplifying and detecting said voltages, and utilizing both said voltages for reception.

HAROLD OLAF PETERSON.